US010702961B2

United States Patent
Gontarski et al.

(10) Patent No.: US 10,702,961 B2
(45) Date of Patent: Jul. 7, 2020

(54) MULTIFRAME BLADE TIP WELDING FIXTURE

(71) Applicant: General Electric Company, Schenectady, NY (US)

(72) Inventors: Tomasz Gontarski, Warsaw (PL); Grzegorz Poltorak, Warsaw (PL); Piotr Steckowicz, Warsaw (PL); Michal Kowalczyk, Warsaw (PL); Marek Miekus, Warsaw (PL)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 15/919,269

(22) Filed: Mar. 13, 2018

(65) Prior Publication Data
US 2019/0084103 A1  Mar. 21, 2019

(30) Foreign Application Priority Data

Apr. 11, 2017 (EP) .................................. 17461520

(51) Int. Cl.
*B23Q 3/06* (2006.01)
*F01D 5/00* (2006.01)
(Continued)

(52) U.S. Cl.
CPC .............. *B23Q 3/063* (2013.01); *B23K 31/02* (2013.01); *B23K 37/0443* (2013.01); *B23P 6/007* (2013.01); *B23P 6/045* (2013.01); *B25B 5/14* (2013.01); *F01D 5/005* (2013.01); *F01D 25/285* (2013.01); *B23K 2101/001* (2018.08);
(Continued)

(58) Field of Classification Search
CPC . B23Q 3/063; B25B 5/14; B23P 6/007; B23P 6/045; F01D 25/285; F01D 5/005; F05D 2230/31; F05D 2240/307; F05D 2230/232; F05D 2230/80; B23K 37/00;
(Continued)

(56) References Cited

U.S. PATENT DOCUMENTS 3,668,913 A   6/1972  Morris
5,235,745 A   8/1993  Fraser
(Continued)

OTHER PUBLICATIONS

Extended European Search Report and Opinion issued in connection with corresponding EP Application No. 17461520.3 dated Oct. 24, 2017.

*Primary Examiner* — Ryan J. Walters
(74) *Attorney, Agent, or Firm* — Hoffman Warnick LLC

(57) ABSTRACT

A system includes a stand having a first axis, a first arm, and a second arm. The first arm and the second arm extend from the axis. The first arm is configured to rotate about the axis and the second arm is configured to rotate about the axis. The system includes a first can coupled to the first arm. The first can is configured to be disposed around a first tip of a first airfoil, the first can is configured to receive a first gas flow, and the first can is configured to distribute the first gas flow to a first work cavity around the first tip of the first airfoil. The system further includes a second can coupled to the second arm. The second can is configured to be disposed around a second tip of a second airfoil, the second can is configured to receive a second gas flow, and the second can is configured to distribute the second gas flow to a second work cavity of the second airfoil.

20 Claims, 6 Drawing Sheets

(51) Int. Cl.
  *F01D 25/28* (2006.01)
  *B23K 31/02* (2006.01)
  *B23K 37/04* (2006.01)
  *B23P 6/00* (2006.01)
  *B25B 5/14* (2006.01)
  *B23P 6/04* (2006.01)
  *B23K 101/00* (2006.01)

(52) U.S. Cl.
  CPC .... *F05D 2230/232* (2013.01); *F05D 2230/31* (2013.01); *F05D 2230/80* (2013.01); *F05D 2240/307* (2013.01)

(58) Field of Classification Search
  CPC ................ B23K 37/0443; B23K 31/02; B23K 2101/001
  See application file for complete search history.

(56) References Cited

U.S. PATENT DOCUMENTS

| | | |
|---|---|---|
| 5,319,179 A | 6/1994 | Joecks et al. |
| 5,622,638 A | 4/1997 | Schell et al. |
| 5,913,555 A | 6/1999 | Richter et al. |
| 6,054,672 A | 4/2000 | Foster et al. |
| 6,247,895 B1 * | 6/2001 | Brooks ................ F01D 5/147 416/62 |
| 6,907,318 B2 | 6/2005 | Passmore et al. |
| 8,061,699 B2 | 11/2011 | Wang et al. |
| 8,925,200 B2 | 1/2015 | Hasselberg et al. |
| 2009/0079121 A1 | 3/2009 | Smolarek |
| 2014/0165376 A1 | 6/2014 | Soucy et al. |
| 2014/0341665 A1 * | 11/2014 | Clark ................ B23Q 11/0042 408/67 |
| 2015/0114938 A1 | 4/2015 | Mottin |
| 2015/0352676 A1 | 12/2015 | Arjakine et al. |

* cited by examiner

MULTIFRAME BLADE TIP WELDING FIXTURE

BACKGROUND

The subject matter disclosed herein relates to airfoils of a gas turbine system, and more specifically, to welding fixture for airfoils, such as turbine blades.

Gas turbine systems typically include a gas turbine engine having a compressor, a combustor, and a turbine. The compressor is configured to use compressor blades to compress and feed air into the combustor for combustion with fuel. For example, the compressor blades may extend radially outwards from a supporting rotor, and the rotation of the compressor blades may force air into the combustor. The combustion gases may flow through one or more turbine stages of the turbine to generate power to drive a load. Each turbine stage may include multiple turbine blades disposed around a rotor. During operation of the gas turbine system, the tips of the blades (e.g., compressor and/or turbine blades) may wear down due to rapid rotation and/or high operating temperatures. The tips of the airfoils may be welded to repair the tips.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system includes a stand having a first axis, a first arm, and a second arm. The first arm and the second arm extend from the axis. The first arm is configured to rotate about the axis and the second arm is configured to rotate about the axis. The system includes a first can coupled to the first arm. The first can is configured to be disposed around a first tip of a first airfoil, the first can is configured to receive a first gas flow, and the first can is configured to distribute the first gas flow to a first work cavity around the first tip of the first airfoil. The system further includes a second can coupled to the second arm. The second can is configured to be disposed around a second tip of a second airfoil, the second can is configured to receive a second gas flow, and the second can is configured to distribute the second gas flow to a second work cavity of the second airfoil.

In a second embodiment, a method of repairing airfoil tips includes supplying a gas flow to a first can disposed about a first tip of a first airfoil when the first can is in a work position about the axis of a stand. The first can is coupled to the stand. The method includes adding a first weld material to the first tip of the first airfoil when the first can is in the work position about the axis. The method further includes rotating the first can and a second can to position the second can in the work position about the axis of the stand. The second can is coupled to the stand. The method includes supplying the gas flow to the second can disposed about a tip of a second airfoil when the second can is in the work position about the axis of the stand. The method further includes adding second weld material to the second tip of the second airfoil when the second can is in the work position about the axis.

In a third embodiment, a system includes a stand having an axis. The system further includes a first arm and a second arm, wherein the first arm and the second arm extend from the axis and are configured to rotate about the axis. The first arm is coupled to the stand at a first axial position and is configured to be adjusted relative to the stand to adjust the axial height. The system further includes a first base and a second base. The first base corresponds to the first arm and is configured to support a first root of a first airfoil, wherein the first root is opposite a first tip of the first airfoil. The second base corresponds to the second arm and is configured to support a second root of a second airfoil, wherein the second root is opposite the second tip. The system further includes a first can coupled to the first arm. The first can is configured to be disposed around the first tip of the first airfoil, the first can is configured to receive a first gas flow, and the first can is configured to distribute the first gas flow to a first work cavity around the first tip of the first airfoil. The system further includes a second can coupled to the second arm. The second can is configured to be disposed around the second tip of the second airfoil, the second can is configured to receive a second gas flow, and the second can is configured to distribute the second gas flow to a second work cavity around the second tip of the second airfoil.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, the rotation of the compressor blades in the compressor of a gas turbine system may force air into the combustor for combustion with fuel. The combustion gases may flow through one or more turbine stages of the turbine of a gas turbine system containing turbine blades to generate power to drive a load. During operation of the gas turbine system, the tips of the compressor and/or turbine blades may wear down due to rapid rotation, potential contact with the walls (e.g., shrouds) of the compressor or turbine, high operating temperatures, or any combination thereof. The blades may be removed from the gas turbine system for repair of the tips.

With the foregoing in mind, the disclosed embodiments include a multiframe blade tip welding fixture. Specifically, the welding fixture may be used to mount and repair multiple blades. The multiframe blade tip welding fixture may have adjustable bases and removable cans configured to conform use of the fixture to various blade shapes. The multiframe blade tip welding fixture may have cans and bases that may rotate around an axis of the welding fixture. Additionally, or in the alternative, the welding fixture may have an axial height adjustment enabling welding of the tips of blades of various heights and shapes to be performed by a single welder. The rotation of the bases and the cans about the welding fixture and the axial height adjustment capability may enable multiple (e.g., 4) blades to be repaired in short succession by a single welder with a single multiframe blade tip welding fixture. It should be understood that the present embodiments are discussed within the context of compressor and turbine blades, however they are also applicable to any type of airfoils, such as blades, vanes, and propellers.

Figure 1:
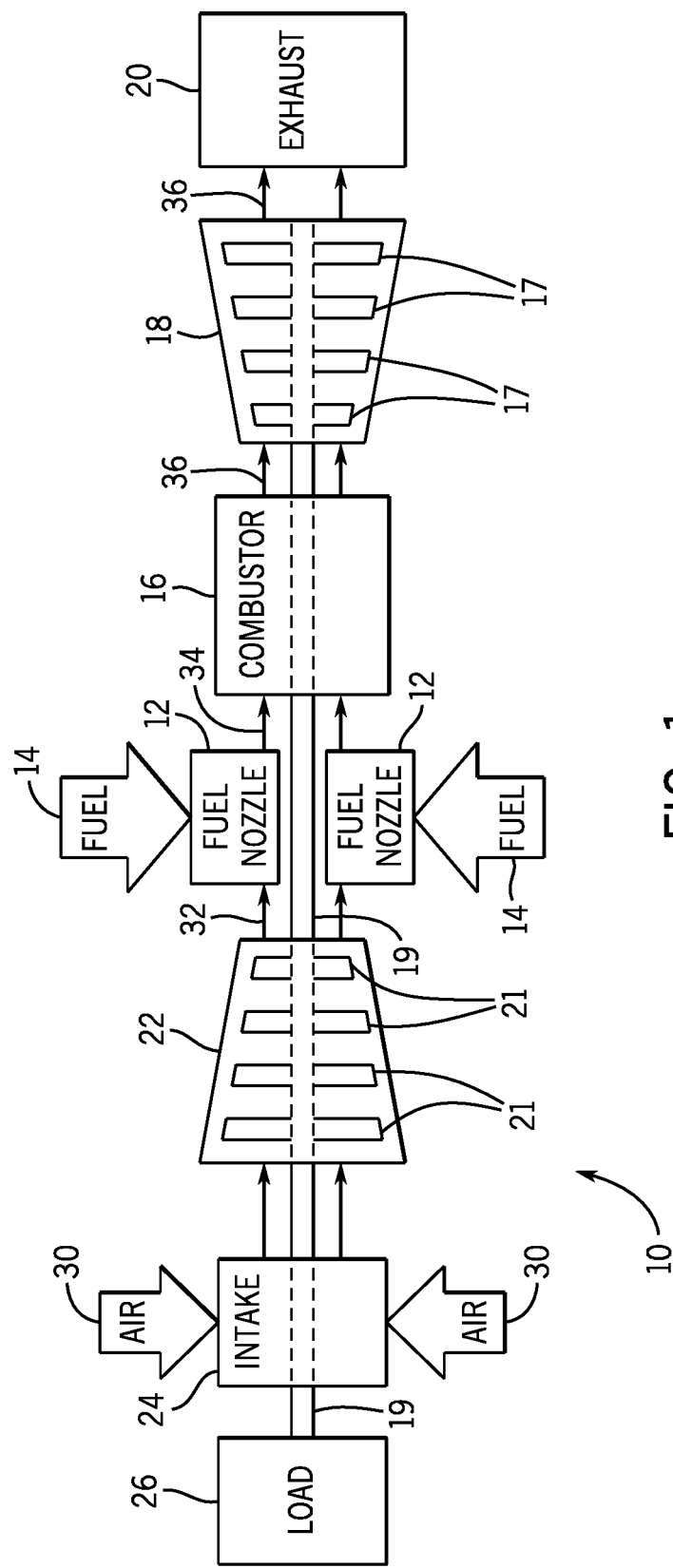
FIG. 1 is a block diagram of an embodiment of a turbine system with compressor and turbine blades.

Turning now to the drawings and referring first to FIG. 1, a block diagram of an embodiment of a gas turbine system 10 is illustrated. The diagram includes fuel nozzles 12, fuel 14, and combustor 16. As depicted, fuel 14 (e.g., a liquid fuel and/or gas fuel, such as natural gas) is routed to the turbine system 10 through fuel nozzles 12 into combustor 16. The combustor 16 ignites and combusts the air-fuel mixture 34, and then directs hot pressurized exhaust gas 36 into a turbine 18. The exhaust gas 36 passes through turbine blades 17 of a turbine rotor in the turbine 18, thereby driving the turbine 18 to rotate. The coupling between the blades 17 in the turbine 18 and the shaft 19 will cause the rotation of the shaft 19. The shaft 19 may be coupled directly or indirectly to one or more components (e.g., compressor 22, load 26) throughout the turbine system 10. Eventually, the exhaust gases 36 of the combustion process may exit the turbine system 10 via an exhaust outlet 20.

In an embodiment of the turbine system 10, compressor vanes or blades 21 are included as components of the compressor 22. The blades 21 within the compressor 22 may be coupled to the shaft 19, and will rotate as the shaft 19 is driven to rotate by the turbine 18. The compressor 22 may intake air 30 to the turbine system 10 via an air intake 24. Further, the shaft 19 may be coupled to a load 26, which may be powered via rotation of the shaft 19. As appreciated, the load 26 may be any suitable device that may generate power via the rotational output of the turbine system 10, such as a power generation plant or an external mechanical load. For example, the load 26 may include an electrical generator, a propeller of an airplane, and so forth. The air intake 24 draws air 30 into the turbine system 10 via a suitable mechanism, such as a cold air intake, for subsequent mixture of air 30 with fuel 14 via the fuel nozzles 12. Air 30 taken in by the turbine system 10 may be fed and compressed into pressurized air 32 by rotating the blades 21 within the compressor 22. The pressurized air 32 may then be fed into one or more fuel nozzles 12. The fuel nozzles 12 may then mix the pressurized air 32 and the fuel 14, to produce a suitable air-fuel mixture 34 for combustion, e.g., a combustion that causes the fuel 14 to more completely burn, so as not to waste the fuel 14 or cause excess emissions in the exhaust gases 36.

The vanes or blades 21 of the compressor 22 and the blades 17 of the turbine 18 may become worn down at the tip from high operating temperatures, rapid rotation, and use over time. The tips of the blades 21 and 17 may be repaired via welding. The blades 21 and 17 may be removed from the turbine system 10 for welding repair, and may be mounted onto a multiframe blade tip welding fixture, as discussed in more detail below.

Figure 2:
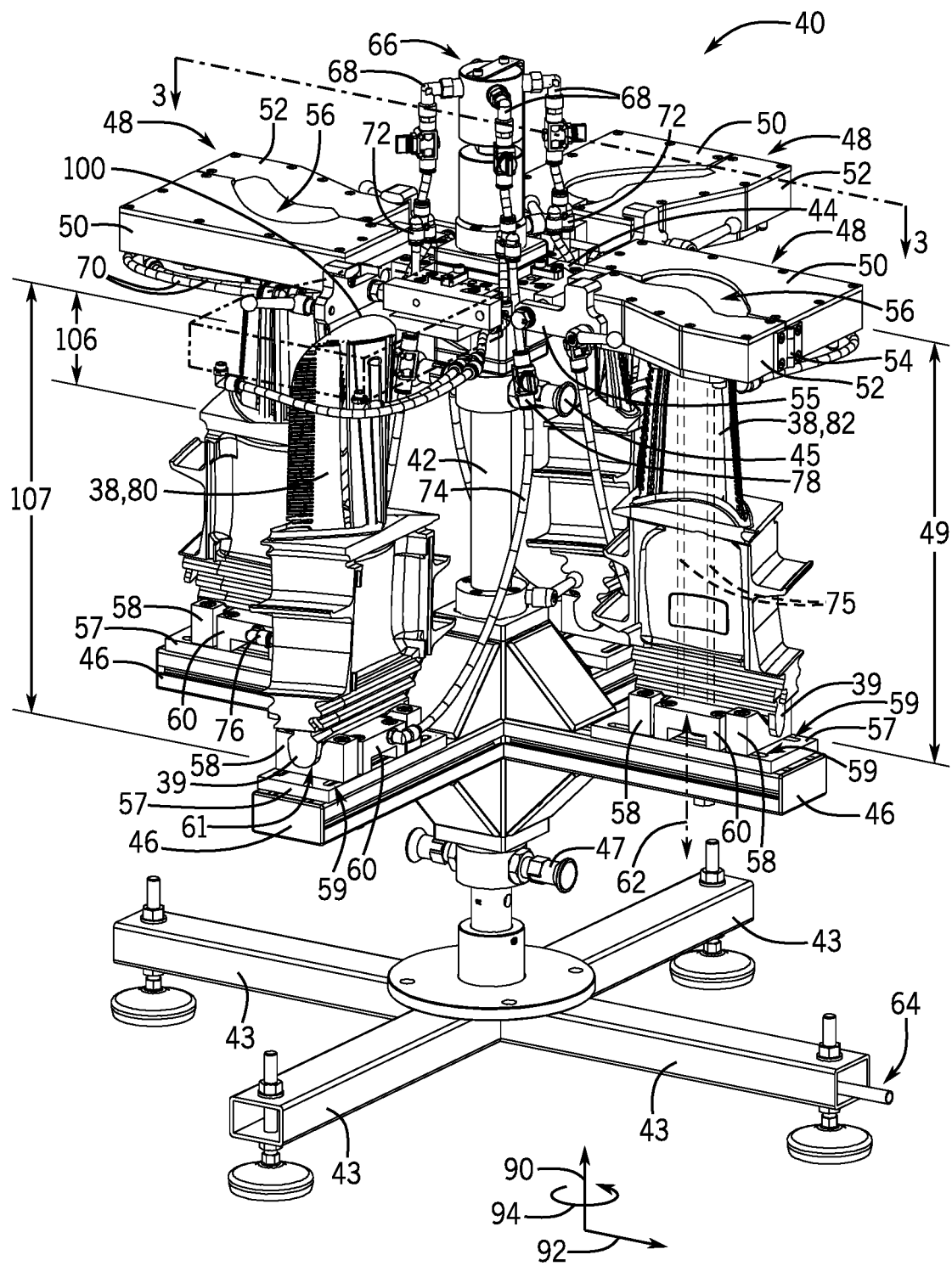
FIG. 2 is a perspective view of an embodiment of a multiframe blade tip welding fixture, in accordance with an embodiment of the present disclosure.

FIG. 2 is a perspective view of an embodiment of a multiframe blade tip welding fixture 40 that may be used for welding repair of the tips of airfoils 38 (e.g., turbine blades 17, compressor blades 21, vanes, propellers). To facilitate discussion, the multiframe blade tip welding fixture 40 and its components may be described with reference to an axial axis or direction 90, a radial axis or direction 92, and a circumferential axis or direction 94. The multiframe blade tip welding fixture 40 may have a vertical stand 42 extending in an axial direction 90. The stand 42 may extend from multiple legs 43. In the illustrated embodiment, four legs 43 are depicted, however the multiframe blade tip welding fixture may have any number of legs 43 (e.g., 2, 3, 5, 6, or more) or a platform or a footing attached to the stand 42.

A number of arms 44 and bases 46 may be rotatably coupled to the stand 42. The arms 44 and the bases 46 may extend in a radial direction from the stand 42. The arms 44 and bases 46 of the multiframe blade tip welding fixture 40 may rotate circumferentially 94 around the stand 42 and axial axis 90. The circumferential 94 rotation may enable a person utilizing the multiframe blade tip welding fixture 40 for repair to more quickly and efficiently move from one airfoil 38 repair to the next. The arms 44 may be axially positioned along the stand 42 above the bases 46. There may be an adjustment knob 45 associated with the group of arms 44 positioned along the stand 42 that may enable the axial height between the arms 44 and the bases 46 to be adjusted along the axial axis 90. Similarly, there may be an adjustment knob 47 associated with the group of bases 46 positioned along the stand 42 that may enable the axial height between the bases 46 and the arms 44 to be adjusted along the axial axis 90. The adjustment knobs 45 and 47 may enable variable height arrangements of the arms 44 and the bases 46, thus enabling a variable distance between the arms 44 and the bases 46. A variable distance 49 between the arms 44 and the bases 46 may enable use of the multiframe blade tip welding fixture 40 with a variety of sizes and lengths of airfoils 38 (e.g., blades, vanes, propellers). Each respective adjustment knob 45 and 47 may further include a lock that may be used to lock an axial height position of the arms 44 and the bases 46 to a particular distance indicated by the length of the coupled airfoils 38. In some embodiments, the lock of the adjustment knobs 45 and 47 may further enable locking the rotation of the arms 44 and bases 46 circumferentially 94 around the stand 42 for locking a particular airfoil 38 in a working position.

The number of arms 44 and bases 46 extending from the stand 42 may vary, however the number of arms 44 may be equal to the number of bases 46. In the illustrated embodiment, four arms 44 and four bases 46 are depicted, however there may be any number (e.g., 2, 3, 5, 6, or more) of arms 44 and bases 46. The number of arms 44 and bases 46 may indicate the number of airfoils 38 that may be coupled to the multiframe blade tip welding fixture 40 at a given time. The arms 44 may be positioned evenly and circumferentially 94 around the stand 42 and may be separated from each other by 90°. However, the arms 44 may be positioned at any angle (e.g., 45°, 72°, 90°) relative to each other, depending on the number of arms 44 extending from the stand 42. Similarly, the bases 46 may be positioned evenly and circumferentially 94 about the stand 42 and may be separated from each other by any angle (e.g., 45°, 72°, 90°) depending on the number of bases 46 extending from the stand 42. The bases 46 may secure the roots of the airfoils 38, while the arms 44 may couple with cans 48 proximate to the tips.

Each arm 44 may removably couple to a respective can 48 via a dovetail connection, or other connection, as discussed in detail below. The cans 48 may have a dovetail connector, or other connector that couples to the arms 44 of the multiframe blade tip welding fixture 40. The connection between the arms 44 of the multiframe blade tip welding fixture 40 and the cans 48 may enable the cans 48 to be modular and interchangeable for use of the multiframe blade tip welding fixture 40 with a variety of types and shapes of airfoils 38. Thus a variety of shapes of cans 48 may be coupled to the arms 44 of the multiframe blade tip welding fixture 40 in order to accommodate use of the multiframe blade tip welding fixture 40 with a variety of airfoil 38 types and shapes. A can 48 may be designed to at least partially encompass the tips of the respective airfoil 38 within a work cavity 56 of the can 48. The work cavity 56 may be formed from a first portion 50 of the can 48 and a second portion 52 of the can 48 that may open and close via a hinge 54. In some embodiments, the hinge 54 may be positioned along a radial edge of the can 48 that is opposite from the connector to the arm 44. Each can 48 may include a clamp 55 that may be coupled to the connector. The clamp 55 may secure the first portion 50 and the second portion 52 of each can together around the tip of the airfoil 38 in a closed position. The structure and functionality of the cans 48 will be discussed in more detail with reference to FIGS. 3 and 4.

The bases 46 may be used to support or hold the roots 39 of the airfoils 38. In some embodiments, the airfoils 38 may be coupled to the bases 46 prior to being coupled to the respective cans 48 for repair. Each base 46 may include a base plate 57 and multiple base supports 58. The base supports 58 may be structured such that a dovetail indentation 61 is positioned facing up toward the arms 44, enabling the root 39 of an airfoil 38 to be coupled to the base 46 by positioning the root 39 within the indentation 61 of the base support 58. The base plate 57, may be positioned on an upper surface of the base 46 and may have multiple grooves 59 that may enable sliding of the base supports 58 on the base plate 57 along a radial axis 92. Further the base plate 57 may be positioned in a configuration parallel to the base 46, however the base plate 57 may be configured to twist or rotate around a center axis 62 of the base plate 57 such that the base plate 57 may be positioned at any non-parallel direction with respect to the base 46. The sliding of the base supports 58, along with the rotation of the base plate 57 may enable the bases 46 to be configured for use with a variety of types, shapes, and sizes of airfoils 38. For example, a particular type of airfoil 38 may have a twisting structure such that the root 39 of the airfoil 38 is not oriented in the same direction as a chord across a tip 100. The root 39 of the airfoil 38 is opposite the tip 100. The base plate 57 may be rotated around the center axis 62 of the base plate 57 on the base 46 such that it may support the root of the airfoil 38 in a position suitable for tip repair, while the base supports 58 may slide along the grooves 59 in the base plate 57 to positions suitable to support the size of the airfoil 38. Further the bases 46 may include a base port 60 that may be positioned between the base supports 58 on the base plate 57. The base port 60 may be used to distribute a shielding gas, for example argon, through body of the airfoil 38 itself via the root 39. The structure of the bases 46 and the base ports 60 will be discussed in more detail with reference to FIGS. 5 and 6.

The multiframe blade tip welding fixture 40 may include a gas distribution system that may be used to distribute a shielding gas to the work cavities 56 of the cans 48. In some embodiments, the shielding gas is distributed to the base ports 60 of the bases 46. A shielding gas may be used in the welding of the airfoil 38 tips to prevent exposure of the welding material to the ambient atmosphere, as elements of the ambient atmosphere may cause results such as unwanted porosity in the weld material and excessive spatter. The shielding gas may include, but is not limited to, argon, carbon dioxide, oxygen, helium, hydrogen, or combinations thereof. The gas distribution system of the multiframe blade tip welding fixture 40 may receive a supply of the shielding gas from a gas source. In the illustrated embodiment, the intake 64 for the shielding gas into the gas distribution system of the multiframe blade tip welding fixture 40 may located at the foot of the stand 42. The intake 64 may direct the shielding gas along the axial axis 90 through the stand 42 to a manifold 66 located near the top of the stand 42. The stand may have an annular structure to enable distribution of gas from the inlet 64 to the manifold 66. Although illustrated in FIG. 2 near the top of the stand 42, the manifold 66 of the gas distribution system may be located at various other positions along the stand 42 or axis 90. Alternatively, the intake 64 and the manifold 66 may be located away from the structure of the multiframe blade tip welding fixture 40.

The manifold 66 may distribute the shielding gas to can distribution lines 68. The can distribution lines 68 may distribute the shielding gas to the work cavities 56 of the cans 48. In certain embodiments, the distribution lines 68 may branch into multiple distribution line branches 70 at a valve 72 locate along the can distribution lines 68. In such a case, there may be multiple branch distribution lines 70 distributing the shielding gas to the cans 48, for example there may be branch distribution lines 70 distributing gas to each of the first portion 50 and the second portion 52 of the cans 48. Distribution of the shielding gas into the work cavity 56 of the cans 48 will be discussed in more detail with reference to FIGS. 3 and 4. The valves 72 may be located along the can distribution lines 68 and may control the flow of gas to each respective can 48, which may enable the shielding gas to only be distributed to the can 48 that may be in a work position (i.e., a position accessible to the user of the multiframe blade tip welding fixture 40 and to which welding is being performed). Controlling the flow of gas may aid distributing an appropriate amount of shielding gas to perform the repairs, thereby reducing waste of shielding gas.

Further, in certain embodiments, the gas distribution system may include one or more base distribution lines 74 that distribute the shielding gas from the manifold 66 or from the valves 72 to the base ports 60. In some embodiments, each airfoil 38 may have cooling passages 75 running from the root 39 to the tip 100 of the airfoil 38. The base port 60 may couple to the cooling passages 75 at the root 39 of the airfoil 38 and may distribute the shielding gas through the cooling passages 75 in the airfoil 38 to facilitate cooling. There may be base distribution valves 78 along the base distribution lines 74 that may be used to control the flow of shielding gas to each respective base port 60, enabling the base distribution lines 74 to distribute the shielding gas to only to airfoils 38 that may have the cooling passages 75 and to only those particular airfoils 38 when in the working position. Controlling the flow of gas may aid distributing an appropriate amount of shielding gas to perform repairs, thereby reducing waste of shielding gas.

With the preceding in mind, one or more airfoils 38 to be repaired may be positioned by the root 39 of the airfoils 38 on the bases 46 using the base supports 58 and the base plate 57. The tips 100 of the airfoils 38 may be positioned within the cans 48 such that the tips 100 are located within the work cavities 56 of the cans 48. The components of the gas distribution system may distribute shielding gas to the particular can and/or base port coupled to the particular airfoil 38 that may be in the working position. The valves 72 may be used to turn on and off the shielding gas flow such that the shielding gas may only be supplied to the can 48 and/or base plate in the working position. When welding repair is completed on the airfoil 38 in the working position, the arms 44 coupled to the cans 48 and the bases 46 may be rotated such that a next airfoil 38 is moved into the working position. For example, an illustrated first airfoil 80 may be in the working position such that a welder is positioned adjacent to the first airfoil 80 to perform a repair. Then, an illustrated second airfoil 82 may be rotated circumferentially 94 around the axial axis 90 to position the second airfoil 82 in the working position, the position illustrated by the first airfoil 80, when a repair is to be performed on the second airfoil 82. The structure of the bases 46 and their components, the removable and interchangeable nature of the cans 48, and the height adjustment capability of the arms 44 and the bases 46 may enable the multiframe blade tip welding fixture 40 to be utilized with a variety types, shapes, and sizes of airfoils 38 (e.g., blades, vanes, propellers).

Figure 3:
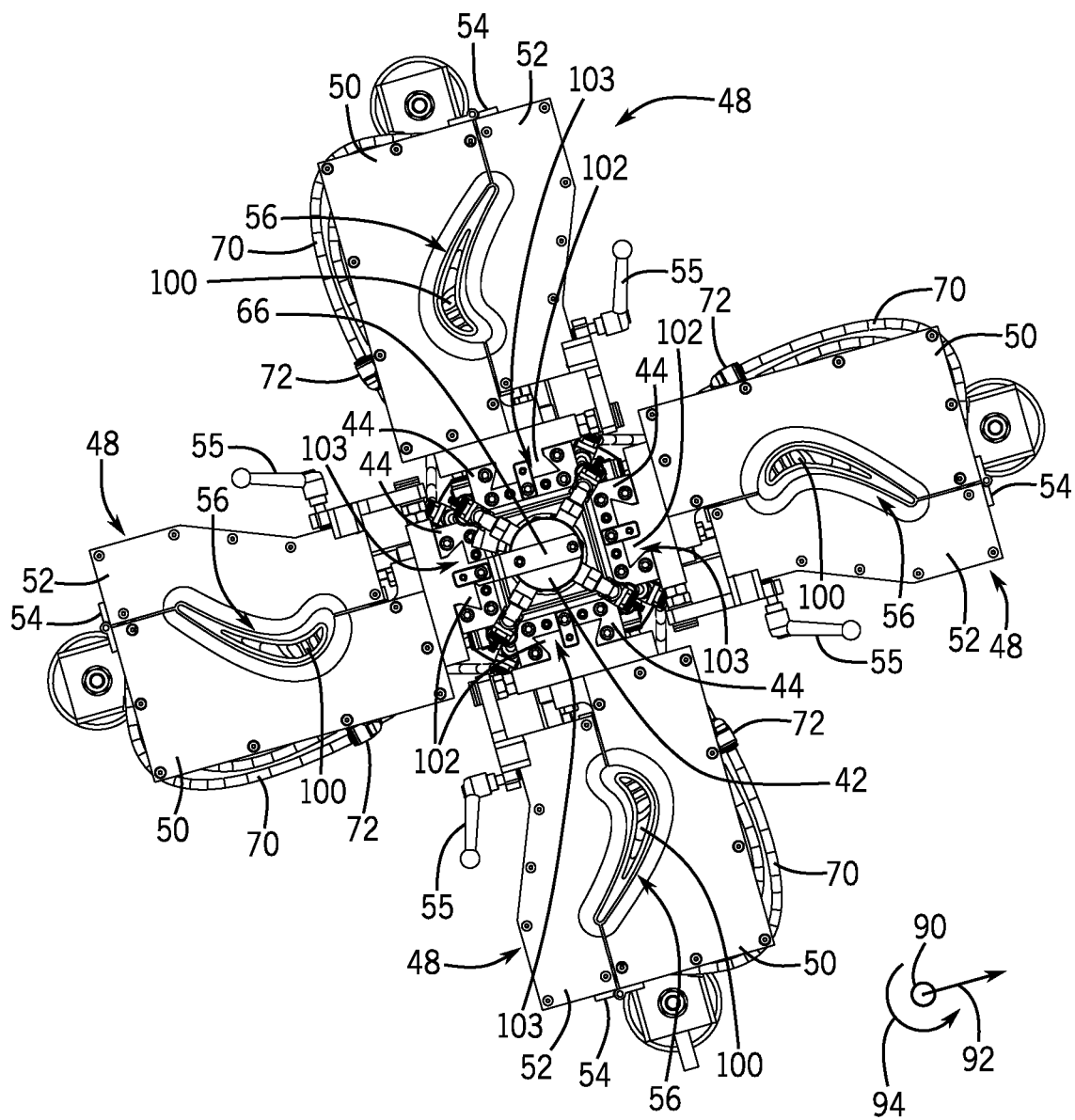
FIG. 3 is a top cut away view of an embodiment of the multiframe blade tip welding fixture of FIG. 2 taken along line 3-3, in accordance with an embodiment of the present disclosure.

As mentioned above, the multiframe blade tip welding fixture 40 may have multiple arms 44 rotatably coupled to the stand 42. The arms 44 may each be coupled to cans 48. FIG. 3 is a top cut away view of an embodiment of the multiframe blade tip welding fixture 40 of FIG. 2, taken along line 3-3, having four cans 48 coupled to four arms 44. However as discussed above, there may be any number (e.g., 2, 3, 5, 6, or more) of arms 44, each having a can 48 coupled to it. In certain embodiments, the arms 44 may be configured to rotate circumferentially 94 around the axial axis 90 of the stand 42.

The cans 48 may couple to the arms 44 via a connector 102. The structure of the connector 102 may be a dovetail structure, as in the illustrated embodiment, however the connector 102 may have any structure that is associated with the structure of an indentation 103 of the arms 44 such that a mating connection may be formed between the connector 102 of the cans 48 and the indentation 103 of the arms 44. In some embodiments, the connection between the cans 48 and the arms 44 may be any other type of connection, such as a bolted connection, a fastened connection, or a snap connection. The cans 48 may be modular or interchangeable, such that different cans 48 may have varying shapes and sizes of working cavities 56 to enable use of the multiframe blade tip welding fixture 40 with varying types, shapes, and sizes of airfoils 38. The structure of the connectors 102 and the structure of the arms 44 enable the can structure (e.g., size, shape, type) to vary while still enabling the cans 48 to be coupled to the arms 44. The arms 44 may be positioned evenly and circumferentially 94 around the stand 42 and may be separated from each other by 90°. However, the arms 44 may be positioned at any angle (e.g., 45°, 72°, 90°) relative to each other, depending on the number of arms 44 extending from the stand 42.

The cans 48 may be configured to be disposed around a tip 100 of each airfoil 38. The cans 48 may include the first portion 50 and the second portion 52, which may be hinged together via the hinge 54 to form the working cavity 56 within which the airfoil tip 100 may be disposed. When an airfoil tip 100 is disposed within the working cavity 56 of the can 48, the first portion 50 and the second portion 52 of the can 48 may close around the tip 100 and may be clamped together in a closed position using the clamp 55. The clamp 55 may be coupled to the connector 102, as in the illustrated embodiment. In some embodiments, the clamp 55 is coupled to the first portion 50 of the can 48, the second portion 52 of the can 48, or both. When the first portion 50 and the second portion 52 of the can 48 are secured around the tip 100, a surface of each of the first portion 50 and the second portion 52 of the can 48, a clamp plate, may be in contact with the airfoil 38. The edges of the clamp plates may conform to the shape of the airfoil 38 and may be in contact with the airfoil 38 at a point axially offset from the tip 100, such that an end portion 106 of the airfoil 38 including the tip 100 may be disposed inside of the working cavity 56 of the can 48 when the first portion 50 and second portion 52 of the can 48 are in a closed position. The end portion 106 of the airfoil 38 that may be disposed within the working cavity 56 may be less than 25% of a length 107 of the airfoil 38. In certain embodiments, the contact made between the clamp plate of the can 48 and the airfoil 38 may form a seal that may enable the shielding gas distributed into the work cavity 56 by the gas distribution system to remain in the work cavity 56 and around the tip 100 of the airfoil 38 while a repair is being made.

While the first portion 50 and the second portion 52 of the can 48 may form the work cavity 56, where repairs to the tip 100 of the airfoil 38 may be made, the cans 48 may further have a hollow structure, such that a chamber is formed throughout the cans 48. Within the chamber inside of the can 48, there may be multiple layers disposed, as discussed in more detail with reference to FIG. 4.

Figure 4:
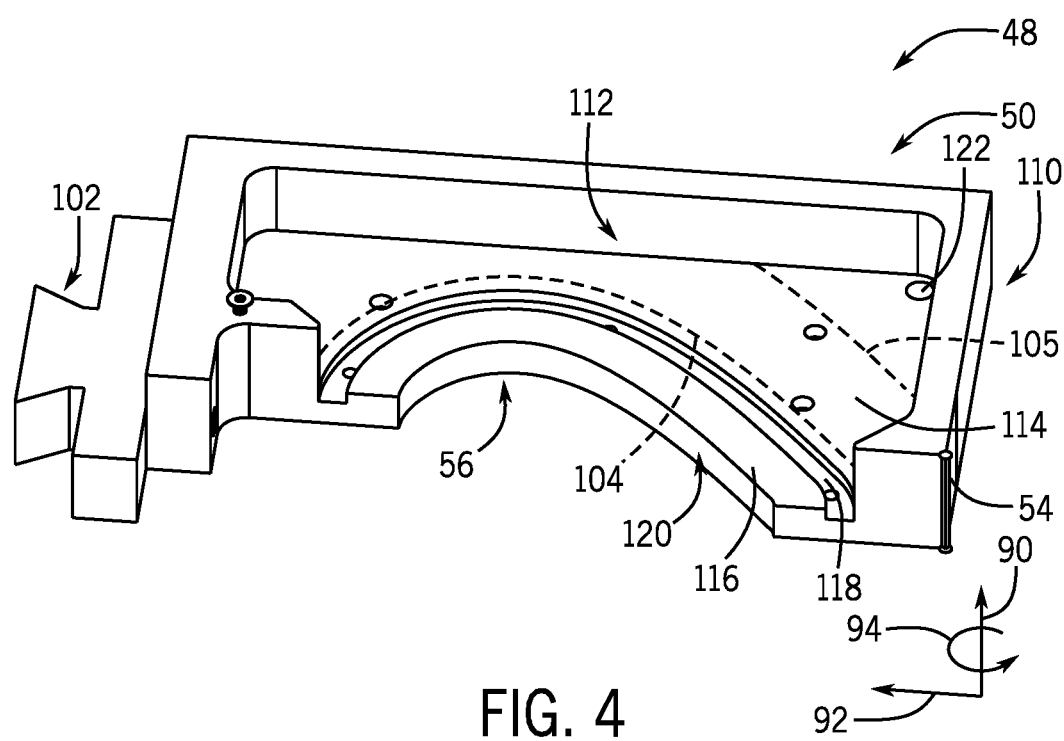
FIG. 4 is a partial cross-sectional view of the inside of an embodiment of a portion of a can of the multiframe blade tip welding fixture, in accordance with an embodiment of the present disclosure.

FIG. 4 is a partial cross-sectional view of the inside of an embodiment of the first portion 50 of the can 48. The illustrated embodiment is discussed within the context of the first portion 50 of the can 48, however it should be understood that the concepts are applicable to the second portion 52 of the can 48 as well. While the first portion 50 and the second portion 52 of the can 48 may form the work cavity 56, where repairs to the tip 100 of the airfoil 38 may be made, the cans 48 may further have a hollow structure, such that a chamber 114 is formed throughout the cans 48. The first portion 50 of the can 48 may have an outer wall 110 and an inner wall 112 that may form the walls of the chamber 114 inside of the can 48. The shielding gas that enters into the first portion 50 the cans 48 from the can distribution lines 68 or from the branch distribution lines 70 through an inlet 122 may be contained within the chamber 114, as well as flow into the work cavity 56 within which the tip 100 of the airfoil may be disposed.

Within the chamber 114, there may be a recess region 118 and multiple layers 104 and 105. There may be any number of layers (e.g., 2, 3, 4, or more) inside of the chamber 114 of the cans 48. In some embodiments, the layers 104 and 105 may include a protective layer that may be configured to protect the cans 48 from spatter and damage during the welding process. Further, in some embodiments, the layers 104 and 105 may be configured to produce a laminar flow of the shielding gas from the can 48 to the airfoil 38 surface, such that the shielding nature of the shielding gas may be optimized along the airfoil tip 100. In this manner, the layer 104 may be a perforated sheet (e.g., mesh, grate) disposed near the airfoil 38 surface that may circulate and distribute the shielding gas around the tip 100 of the airfoil 38 that is in the work cavity 56. In some embodiments, the layer 105 may aid circulation of the shielding gas entering through inlet 122 throughout the chamber 114.

As discussed above, in certain embodiments, the first portion 50, as well as the second portion 52, of the can 48 may have a clamp plate 116 that may contact the surface of the airfoil 38 when the first portion 50 and the second portion 52 are closed. The clamp plates 116 may be in contact with the airfoil 38 at a point axially offset from the tip 100, such that the end portion 106 of the airfoil 38 and the tip 100 may be disposed inside of the work cavity 56 of the can 48 when the first portion 50 and second portion 52 of the can 48 are clamped together in the closed position. The end portion 106 of the airfoil 38 that may be disposed within the work cavity 56 may be less than 25% of the length 107 of the airfoil 38. The contact between the clamp plates 116 and the airfoil 38 may form a seal that may enable the shielding gas distributed into the work cavity 56 by the gas distribution system to remain in the work cavity 56 and around the tip 100 of the airfoil 38 while a repair is being made. A seal may be formed at the edge 120 of the clamp plate 116. The edge 120 of the clamp plate 116 may have a shape that may conform to the shape of the airfoil 38, which may enable the multiframe blade tip welding fixture 40 to be utilized with a variety of types, shapes, and sizes of airfoils. In this manner, the clamp plate 116 of the first portion 50 of the can 48 may have a shape that conforms to a first side of the airfoil 38, and the clamp plate 116 of the second portion 52 of the can 48 may have a shape that conforms to a second side of the airfoil 38. The cans 48 may be modular and interchangeable, and may have clamp plates 116 having varying edge 120 shapes such that they may conform to the varying shapes of a variety of airfoils 38.

Figure 5:
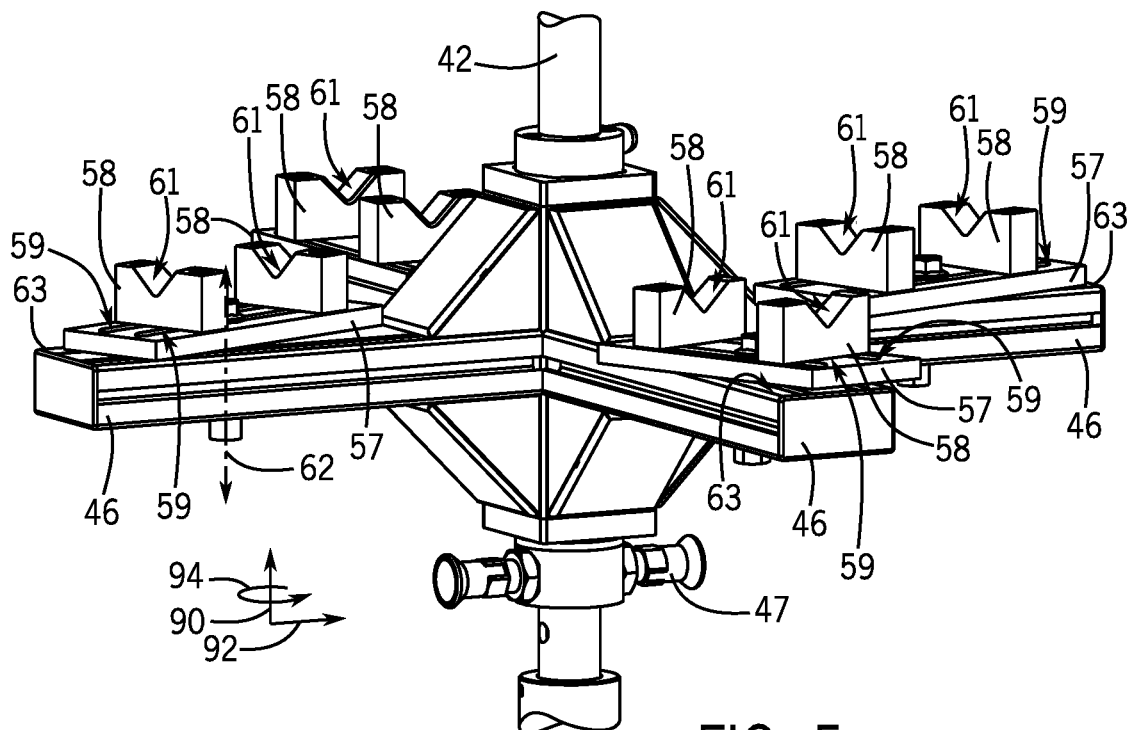
FIG. 5 is a perspective view of an embodiment of the bases of the multiframe blade tip welding fixture of FIG. 2, in accordance with an embodiment of the present disclosure.

FIG. 5 is a perspective view of an embodiment of the bases of the multiframe blade tip welding fixture 40 depicting four bases 46 rotatably coupled to the stand 42. In the illustrated embodiment, four bases 46 are depicted, however there may be any number (e.g., 2, 3, 5, 6, or more) of bases 46. The bases 46 may be positioned evenly and circumferentially 94 about the stand 42 and may be separated from each other by any angle (e.g., 45°, 72°, 90°) depending on the number of bases 46 extending from the stand 42. In certain embodiments, the bases 46 may be configured to rotate circumferentially 94 around the axial axis 90 of the stand 42. Further the height adjustment knob 47 may be used to vary the axial height of the bases along the stand 42. The rotation and height adjustment capability may enable the multiframe blade tip welding fixture 40 to be used with airfoils 38 of varying height and may enable welder to remain stationary and rotate a particular airfoil 38 into the working position.

The bases 46 may secure and position the roots of the airfoils 38 via the base plate 57 and the base supports 58. Each base 46 may include the base plate 57 and multiple base supports 58. The base supports 58 may be structured such that a dovetail indentation 61 is positioned facing up towards the arms 44, enabling the root 39 of an airfoil 38 to be coupled to the base 46 by positioning the root 39 of the airfoil 38 in the indentation 61 of the base support 58. The base plate 57, may be positioned on an upper surface 63 of the base 46 and may have multiple grooves 59 that may enable sliding of the base supports 58 on the base plate 57 along a radial axis 92. Further the base plate 57 may be positioned in a configuration parallel to the base 46, however the base plate 57 may be configured to twist or rotate around a center axis 62 of the base plate 57 such that the base plate 57 may be positioned at any non-parallel direction with respect to the base 46. The sliding of the base supports 58, along with the rotation of the base plate 57 may enable the bases 46 to be configured for use with a variety of types, shapes, and sizes of airfoils 38. For example, a particular type of airfoil 38 may have a twisting structure such that the root 39 of the airfoil 38 is not oriented in the same direction as a chord across the tip 100. The base plate 57 may be rotated around the center axis 62 of the base plate 57 on the base 46 such that it may support the root 39 of the airfoil 38 in a position suitable for tip repair, while the base supports 58 may slide along the grooves 59 in the base plate 57 to positions suitable to support the size of the airfoil 38.

Further in certain embodiments, the bases 46 may include a base port 60 that may be positioned between the base supports 58 on the base plate 57. The base port 60 may be used to distribute a shielding gas, for example argon, through the body of the airfoil 38 itself. The base port 60 will be discussed in more detail with reference to FIG. 6.

Figure 6:
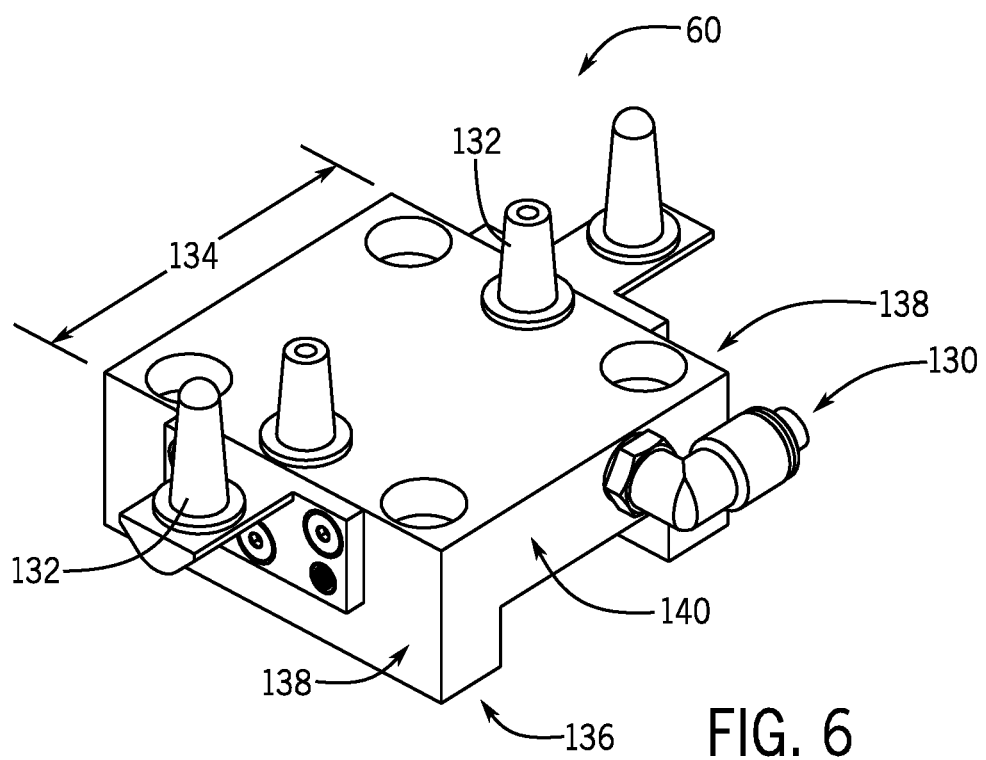
FIG. 6 is a perspective view of an embodiment of a base port of a base of FIG. 5, in accordance with an embodiment of the present disclosure.

FIG. 6 is a perspective view of an embodiment of the base port 60 of the bases 46. The base port 60 may be disposed between the base supports 58 on the base plate 57 of the base 46. In certain embodiments, the base port 60 may be configured to receive the shielding gas from the base distribution line 74 through an inlet 130. The inlet 130 may be disposed on a side 140 of the base port 60 that is not a side 138 configured to be adjacent to the base supports 58. The sides 138 of the base port 60 may be adjacent to, or even in contact with, the base supports 58. A bottom surface 136 of the base port 60 may contact the base plate 57. The base port 60 may have a length 134 that may be the length of the space between the base supports 58 or less, such that the base port 60 may be disposed between the base supports 58. In certain embodiments, the airfoils 38 may have cooling passages 75 running from the root 39 to the tip of the airfoil 38. The base port 60 may include one or more outlets 132 configured to couple to the cooling passages 75 at the root 39 of the airfoils 38 and to distribute the shielding gas to the cooling passages 75 of the airfoils 38 to facilitate cooling of the airfoil as welding repair is being performed.

The base port 60 may be removably coupled to the base 46. In certain embodiments, the base port 60 may be coupled to the base plate 57 of a base 46 while that particular base 46 is in the work position, and may supply the shielding gas to the cooling passages at the root of the airfoil 38 that is in the work position. The bases 46 and cans 48 may be rotated circumferentially 94 around the stand 42 to position a different airfoil 38 in the work position. The base port 60 may be moved to the base 46 coupled to the airfoil 38 that is currently in the work position. However, there may be a base port 60 coupled to each of the bases 46 at a given time.

Figure 7:
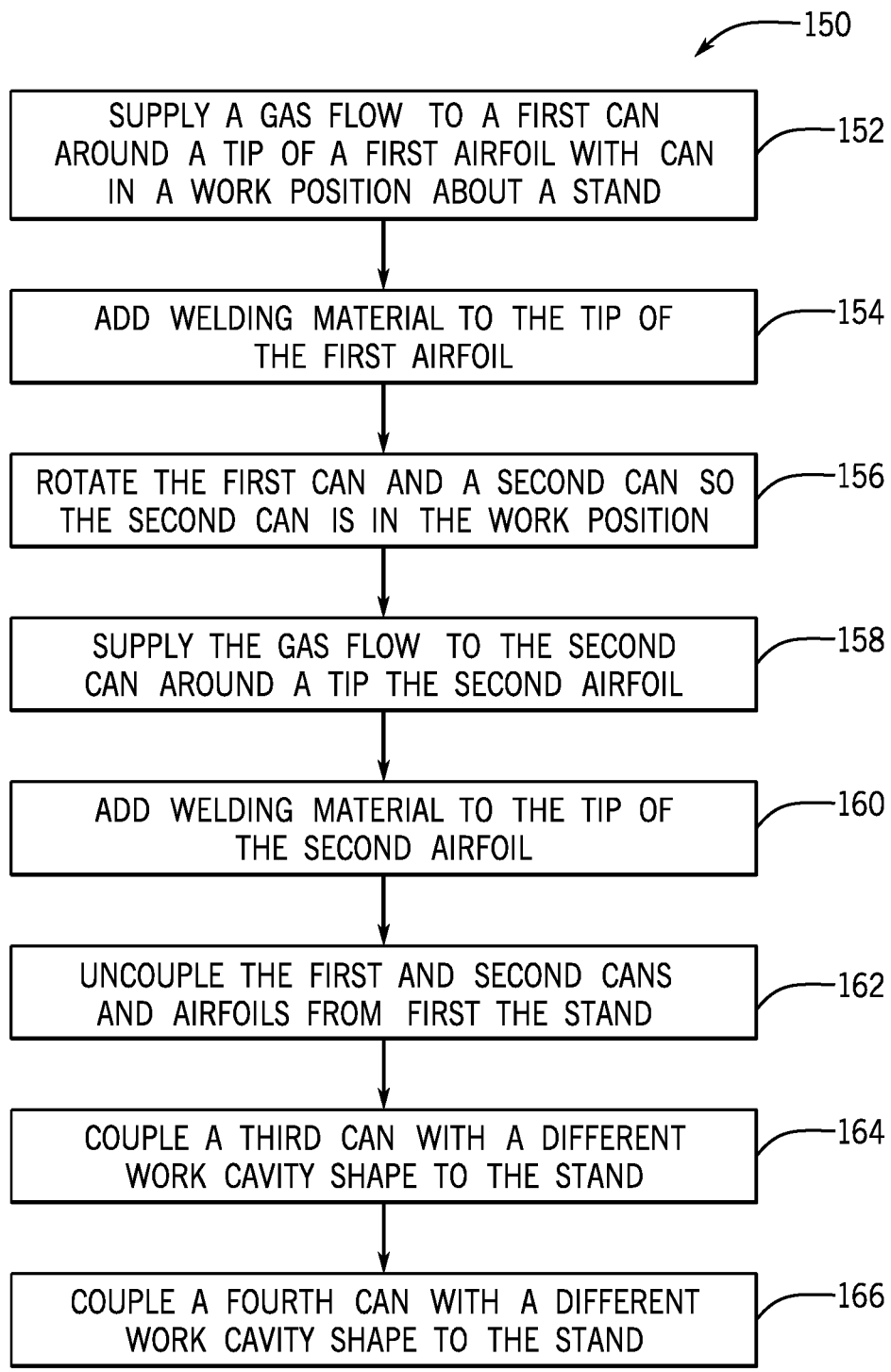
FIG. 7 is a flow diagram of a method of repairing airfoil tips, in accordance with an embodiment of the present disclosure.

With the preceding in mind, FIG. 7 is a flow diagram of a method 150 of repairing airfoil tips using the multiframe blade tip welding fixture 40. First, a supply of shielding gas may be supplied to one of the cans 48 disposed around the tip 100 of the airfoil 38 in the work position. The can 48 is configured to distribute a flow of the shielding gas about the tip 100 of that airfoil 38 when the airfoil 38 is in the work position about the axis 90 of the stand 42 (block 152). Next, a weld material may be added to the tip 100 of the airfoil 38 that is in the work position (block 154). Then the can 48 in the work position and a different can 48 may be rotated via the arms 44 to position the different can 48 in the work position about the axis 90 of the stand 42 (block 156). Next, the shielding gas may be supplied to the can 48 in the work position (block 158). The can 48 may be disposed around the tip 100 of the airfoil 38, and the can 48 may be configured to distribute the flow of shielding gas about the tip 100 of the airfoil 38 that is in the work position. Next, weld material may be added to the tip 100 of the airfoil 38 that is in the work position about the axis 90 (block 160).

In certain embodiments, the method 150 may include supplying a shielding gas flow to the can 48 that is in the work position via a cooling passage 75 at the root 39 of the airfoil 38 when the can 48 is in the work position. The cooling passage 75 may extend to the tip 100 of the airfoil 38. Further, in certain embodiments, an axial height 49 between the can 48 and a corresponding base 46 may be adjusted. The base 46 may be coupled to the root 93 of the airfoil 38 opposite the tip 100, and the base 46 and can 48 may interface with the airfoil 38 when the can 48 is in the work position. Further, in certain embodiments, the method 150 may include uncoupling the can 48 from the arm 44 of the stand 42 (block 162). Next, a different can 38 having a different work cavity 56 shape than the can 38 that was uncoupled may be coupled to the arm 44 (block 164 and block 166).

Technical effects of the disclosed embodiments include a multiframe blade tip welding fixture that may be used for the repair of multiple airfoils at a time. Further, the cans and bases may rotate circumferentially around the stand and the axial height of the cans and bases may be adjusted. The adjustable height capability may enable the multiframe blade tip welding fixture to be utilized in the repair of airfoils (e.g., blades, vanes, propellers) of a variety of heights. The circumferential rotation of the cans and bases about the stand may enable more efficient tip repair as the multiframe blade tip welding fixture may rotate the airfoils to a single work position between the repairs of each tip. Thus, this may enable the welder to work on all of the airfoils while remaining in a single position. Further, the cans may be configured to only supply the shielding gas to the tips of the airfoils, which may enable a cost saving benefit and may enable a more effective welding repair, as the shielding gas may be better concentrated around the repair area. Thereby, the multiframe blade tip welding fixture may enable a reduction in the consumption of the shielding gas. Further, the work cavities of the cans may conform to the shape of the tips of a variety of different airfoil types and shapes and the cans may be interchangeable, enabling the multiframe blade tip welding fixture to be utilized for the repair of airfoils of a variety of types and shapes. Further still, the multiframe blade tip welding fixture may include a base port having one or more outlets configured to supply the shielding gas to cooling passages within the airfoils that run from the root of the airfoil to the tip of the airfoil. This may enable a more effective tip repair or tip cap replacement, in certain embodiments, by providing additional cooling to particular airfoils.

This written description uses examples to disclose the concepts discussed herein, including the best mode, and also sufficient disclosure to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a stand comprising an axis;
a first arm and a second arm, wherein the first arm and the second arm extend from the axis, wherein the first arm and the second arm are configured to rotate about the axis;
a first base and a second base coupled to the stand, wherein the first base is configured to support a first root of a first airfoil, wherein the first root is opposite a first tip of the first airfoil, and wherein the second base is configured to support a second root of a second airfoil, wherein the second root is opposite a second tip of the second airfoil;
a first can coupled to the first arm, wherein the first can is configured to be disposed around the first tip of the first airfoil, the first can is configured to receive a first gas flow, and the first can is configured to distribute the first gas flow to a first work cavity around the first tip of the first airfoil; and
a second can coupled to the second arm, wherein the second can is configured to be disposed around the second tip of the second airfoil, the second can is configured to receive a second gas flow, and the second can is configured to distribute the second gas flow to a second work cavity around the second tip of the second airfoil,
wherein the first arm is coupled to the stand at a first axial position, and the first base is coupled to the stand at a second axial position axially below the first axial position along the axis.

2. The system of claim 1, comprising a gas distribution system, wherein the gas distribution system comprises:
a manifold disposed on the stand, wherein the manifold is configured to receive a supply flow from a gas source;
a first distribution line coupled between the manifold and the first can, wherein the manifold is configured to distribute the first gas flow from the supply flow to the first can via the first distribution line; and
a second distribution line coupled between the manifold and the second can, wherein the manifold is configured to distribute the second gas flow from the supply flow to the second can via the second distribution line.

3. The system of claim 2, wherein the manifold is disposed along the axis of the stand.

4. The system of claim 1, wherein one or both of the first arm and the first base is configured to be adjusted relative to the stand to adjust an axial height between the first axial position and the second axial position along the axis.

5. The system of claim 1, wherein the first can comprises a first portion, a second portion, and a hinge disposed between the first portion and the second portion, wherein the second portion is configured to rotate about the hinge to circumferentially enclose the first tip of the first airfoil with the first portion when the second portion is in a closed position.

6. The system of claim 5, wherein the first portion comprises a first clamp plate and the second portion comprises a second clamp plate, and the first clamp plate and the second clamp plate are configured to interface with a body of the first airfoil below the first tip when the second portion is in the closed position.

7. The system of claim 1, wherein the first base comprises a first port configured to supply a third gas flow to a first cooling passage within the first airfoil, wherein the first cooling passage extends to the first tip of the first airfoil, and the first cooling passage is configured to distribute the third gas flow to the first work cavity.

8. A method of repairing airfoil tips, comprising:
providing the system of claim 1; positioning a first airfoil having a first tip in the system;
supplying a gas flow to the first can disposed about the first tip of the first airfoil when the first can is in a work position about the axis of the stand, wherein the first can is coupled to the stand;
adding a first weld material to the first tip of the first airfoil when the first can is in the work position about the axis;
positioning a second airfoil having a second tip in the system;
rotating the first can and the second can to position the second can in the work position about the axis of the stand, wherein the second can is coupled to the stand;
supplying the gas flow to the second can disposed about the second tip of the second airfoil when the second can is in the work position about the axis; and
adding a second weld material to the second tip of the second airfoil when the second can is in the work position about the axis.

9. The method of claim 8, wherein the first can is disposed around a first end portion of the first airfoil, and the first end portion comprises less than 25 percent of a first length of the first airfoil from the first tip, and the second can is disposed around a second end portion of the second airfoil, and the second end portion comprises less than 25 percent of a second length of the second airfoil from the second tip.

10. The method of claim 8, comprising supplying a second gas flow to the first can via a first cooling passage at a first root of the first airfoil when the first can is in the work position, wherein the first cooling passage extends to the first tip of the first airfoil.

11. The method of claim 8, comprising adjusting an axial height between the first can and a first base, wherein the first base is coupled to a first root of the first airfoil opposite the first tip, and the first base and the first can interface with the first airfoil when the first can is in the work position.

12. The method of claim 8, comprising:
uncoupling the first airfoil and the first can from the stand;
uncoupling the second airfoil and the second can from the stand;
coupling a third can to the stand, wherein the third can comprises a third work cavity shape different from a first work cavity shape of the first can; and
coupling a fourth can to the stand, wherein the fourth can comprises a fourth work cavity shape different from a second work cavity shape of the second can.

13. A system comprising:
a stand comprising an axis,
a first arm, and a second arm, wherein the first arm and the second arm extend from the axis, the first arm is configured to rotate about the axis, and the second arm is configured to rotate about the axis;
a first can coupled to the first arm, wherein the first can is configured to be disposed around a first tip of a first airfoil, the first can is configured to receive a first gas flow, and the first can is configured to distribute the first gas flow to a first work cavity around the first tip of the first airfoil;
a second can coupled to the second arm, wherein the second can is configured to be disposed around a second tip of a second airfoil, the second can is configured to receive a second gas flow, and the second can is configured to distribute the second gas flow to a second work cavity around the second tip of the second airfoil;
a manifold disposed on the stand, wherein the manifold is configured to receive a supply flow from a gas source;
a first distribution line coupled between the manifold and the first can, wherein the manifold is configured to distribute the first gas flow from the supply flow to the first can via the first distribution line; and
a second distribution line coupled between the manifold and the second can, wherein the manifold is configured to distribute the second gas flow from the supply flow to the second can via the second distribution line.

14. The system of claim 13, wherein the gas distribution system comprises a first valve coupled to the first distribution line and a second valve coupled to the second distribution line, wherein the first valve is configured to control the first gas flow, and the second valve is configured to control the second gas flow.

15. The system of claim 13, wherein the manifold is disposed along the axis of the stand.

16. The system of claim 13, further comprising:
a first base extending from the axis and coupled to the stand, wherein the first base is configured to rotate about the axis and to support a first root of the first airfoil, wherein the first root is opposite the first tip; and
a second base extending from the axis and coupled to the stand, wherein the second base is configured to rotate about the axis and to support a second root of the second airfoil, wherein the second root is opposite the second tip.

17. The system of claim 16, wherein the first arm is coupled to the stand at a first axial position, and the first base is coupled to the stand at a second axial position axially below the first axial position along the axis.

18. The system of claim 16, wherein one or both of the first arm and the first base is configured to be adjusted relative to the stand to adjust an axial height between the first axial position and the second position along the axis.

19. The system of claim 13, wherein the first can comprises a first portion, a second portion, and a hinge disposed between the first portion and the second portion, wherein the second portion is configured to rotate about the hinge to circumferentially enclose the first tip of the first airfoil with the first portion when the second portion is in a closed position.

20. The system of claim 19, wherein the first portion comprises a first clamp plate and the second portion comprises a second clamp plate, wherein the first clamp plate and the second clamp plate are configured to interface with a body of the first airfoil below the first tip when the second portion is in the closed position.

\* \* \* \* \*